Jan. 18, 1966 W. P. AYERS 3,229,747
RADIANT BURNER
Filed Sept. 18, 1963
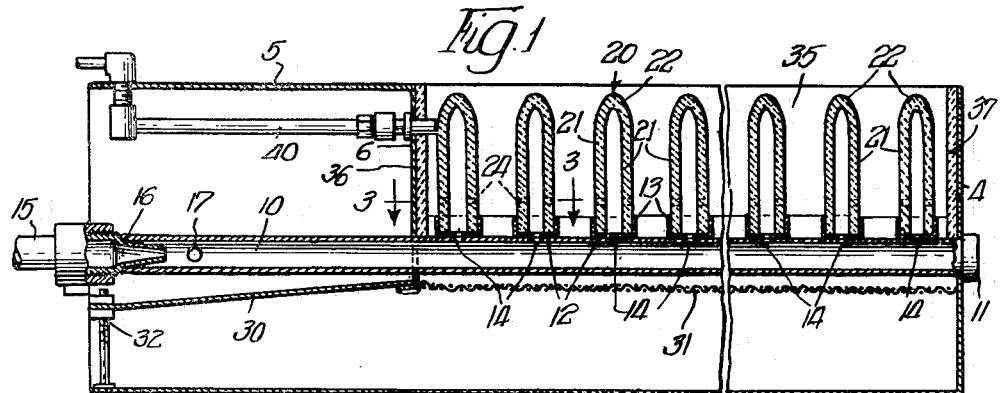
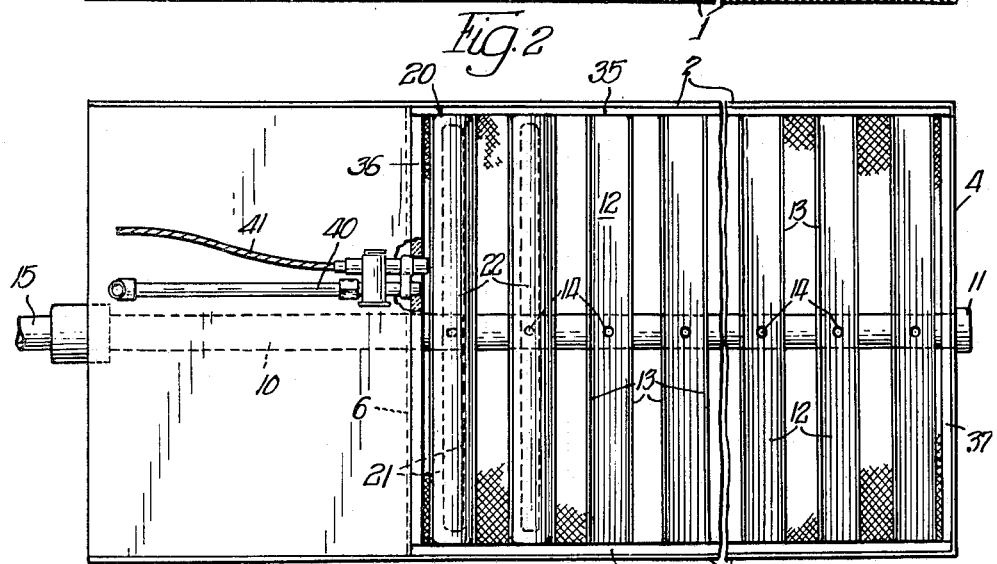
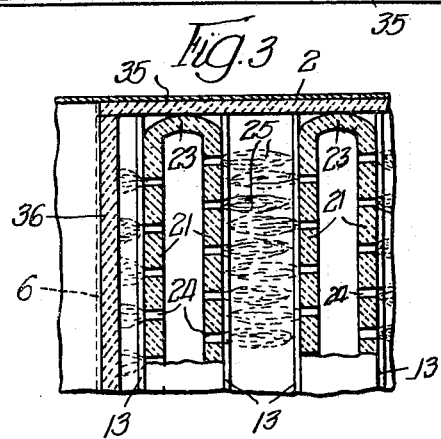
INVENTOR.
William P Ayers,
BY George H. Simmons
Atty

United States Patent Office 3,229,747
Patented Jan. 18, 1966

3,229,747
RADIANT BURNER
William P. Ayers, 390 E. St. Charles Road, Lombard, Ill.
Filed Sept. 18, 1963, Ser. No. 309,659
6 Claims. (Cl. 158—99)

This invention relates to gas-fired radiant burners and has for its principal object the provision of a new and improved burner of this type.

It is a main object of the invention to provide a highly efficient gas-fired radiant burner for use in boilers, furnaces and the like.

Another object of the invention is to provide a gas-fired radiant burner containing a plurality of refractory burner elements spaced apart in parallel relation and having smooth surface walls against which flames emanating from an adjacent element impinge to quickly elevate the burner element to incandescent temperature.

Another object of the invention is to provide a gas-fired radiant burner containing a plurality of refractory burner elements having parallel, vertically disposed side walls through each of which side walls a plurality of horizontally disposed ducts are extended.

Another object of the invention is to provide a radiant burner in which gas flowing through horizontally disposed ducts in each burner element feeds flames which impinge upon flat walls of the adjacent burner element to quickly heat the elements to incandescent temperature.

Another object of the invention is to provide, in the open top chamber in which the burner elements are disposed, liners composed of refractory material and heated to incandescence by heat radiating from the flames and from the incandescent burner elements.

Another object of the invention is to provide in a gas-fired radiant burner an improved structure for supporting refractory burner elements in the burner.

Another object of the invention is to provide a gas-fired radiant burner that can be manufactured and maintained at low cost without sacrificing quality.

Further objects of the invention, not specifically mentioned here, will be apparent from the detailed description and claims which follow, reference being had to the accompanying drawings in which a preferred embodiment of the invention is shown by way of example and in which:

FIG. 1 is an elevational view of a burner embodying the present invention in cross-section along the longitudinal median line of the burner;

FIG. 2 is a plan view of the burner shown in FIG. 1; and

FIG. 3 is a fragmentary cross-sectional view along the line 3—3 of FIG. 1 looking in the direction of the arrows and drawn to an enlarged scale.

Broadly speaking, the present invention relates to an improvement upon the gas-fired radiant burners shown in my prior Patents 2,708,188 and 2,808,878.

Prior art gas-fired radiant burners of which I am aware have usually included burner elements, composed of a refractory material, that contain ducts through which the fuel mixture flows to the flames when the burner is operating. In most instances, these ducts have slanted upwardly oftentimes by as much as 45° to the horizontal and the flames fed therethrough have been directed to sweep over the surface of an adjacent burner element without impinging directly thereagainst. Also, in many of these prior art burners the exterior surfaces of the refractory burner elements have contained grooves indented therein and/or ribs projected therefrom, and as a result these surfaces have greater area than that of a planar surface. As a result, the length of time required to elapse between starting up of the burner and the heating of the refractory elements therein to incandescent temperature has been approximately 90 seconds which is objectionable, particularly in installations in which the burners operate only an average of three minutes before being shut down.

The present invention improves the efficiency of gas-fired radiant burners by decreasing the time required to heat the refractory elements of the burner to incandescence. To this end the side walls of the refractory burner elements are planar and contain no grooves or ribs which increase their surface area. These side walls contain perforations or ducts which are disposed horizontally with the result that flames fed by gas flowing through these ducts are horizontal or nearly so. Adjacent burner elements are spaced apart such a distance that the flames emanating from each burner element impinge upon the side wall of the adjacent element. With this arrangement, the time required to heat the individual burner elements to incandescent temperature is lessened greatly, being achieved in 15 seconds in most instances. Since radiant burners do not attain maximum efficiency until the full radiation from the burner elements is achieved, this shortened heat-up time of the elements adds materially to the overall efficiency of the burner, particularly in installations where short periods of burning are involved.

Also in prior art radiant burners of which I am aware, the refractory burner elements have included a bottom wall in addition to the top, side and end walls. The bottom wall has contained a centrally located perforation, which was registered with a grommet projecting out of the fuel manifold and the element secured to the manifold with a ceramic cement. This construction necessitated assembling of the elements on the manifold in the factory and shipment of the burner with the elements in place therein.

The present invention improves this construction by providing refractory elements which do not have a bottom wall. The fuel supply manifold has fixed upon it metallic trays which consist of a planar bottom wall having short flanges upstanding from each of its edges. This arrangement permits shipping the refractory burner elements separately from the burner structure and also permits easy replacement of a damaged element in the field.

In the preferred embodiment of the invention, the metallic trays abut against the inside faces of the side walls of the burner housing, and the refractory burner elements terminate a short distance inwardly from these walls. Refractory liner strips are supported on the trays and held against the side walls by the burner elements which abut thereagainst. Liner strips also extend from side wall to side wall at the ends of the side wall strips. During operation of the burner the refractory liner strips are heated to incandescent temperature and add to the radiation of the burner elements.

The invention will best be understood by reference to the accompanying drawings from which it will be seen that the wind box or housing consists of a bottom wall 1, side walls 2 and 3, and an end wall 4, all upstanding from the edges of the bottom wall. A top or cover 5 extends from the open end of the wind box and terminates in a downwardly extending fire wall 6 which fire wall, in the example shown, extends slightly below the midpoint of the wind box.

Disposed on the longitudinal, median line of the wind box is a manifold or mixing tube 10 which extends from the open end of the wind box through the fire wall 6 and the end wall 4 where it is capped by suitable means 11. Fixed upon the manifold 10 in spaced apart, parallel relation are a plurality of metallic trays, each consisting of a planar bottom wall 12 from the edges of which flanges 13 extend upwardly. Each tray wall 12 contains a port or perforation 14 that is registered with a similar port in the manifold 10.

Gas supplied to the burner through a supply pipe 15 flows through a frusto conical orifice 16 into the interior of the manifold 10. Movement of the gas through the orifice 16 draws into the manifold primary air of combustion through ports 17 which air mixes with the gas during travel through the manifold.

Disposed in each of the trays 12 is a refractory burner element 20 consisting of parallel planar side walls 21 joined together by a generally semi-circular top wall 22 and by end walls 23. As will be seen best in FIG. 3, each side wall 21 of the burner element contains a plurality of horizontally disposed ports 24 through which gas and primary air flowing into the burner through ports 14 can escape from the burner to support horizontally disposed flames 25 which flames impinge against the side walls 21 of the adjacent burner element. It will be noted from FIG. 3 that in the burner element shown by way of example, ports 24 on one of the side walls 21 are located midway between the ports on the other side wall. Thus, when the burner is in operation, flames 25 emanating from one burned element are disposed midway between flames emanating from the adjacent burner element with a result that the space between adjacent burner elements is virtually completely filled with flames.

While the staggered arrangement of ports 24 shown in FIG. 3 is preferable, other arrangements including alignment of the ports on one side of the element with the ports on the other side thereof are contemplated.

Secondary air needed for complete combustion is drawn into the wind box through the open end thereof and flows beneath a horizontally disposed baffle 30 beneath the fire wall and beneath a horizontally disposed screen wire wall 31 through which the air flows, being drawn upward by the action of the flames emanating from the burner elements. Adjusting means 32 at the forward end of the baffle 30 permits regulation of the quantity of secondary air in obvious manner.

The metallic trays 12 extend from side wall to side wall of the wind box and serve as supports for refractory linear strips 35 which extend from the fire wall 6 to the end wall 4 of the wind box. Fixed upon the fire wall 6 is a strip of refractory material 36 which abuts at its two ends against the side wall strips 35. A similar refractory strip 37 fixed upon the end wall 4 of the wind box abuts against the side wall strips 35. All of the refractory strips extend to the upper edge of the wind box with the result that the combustion zone of the burner is lined with refractory material. The lining of the wind box with refractory material protects the metal therein from excessive heat.

The burner includes a pilot 40, the details of which are not of the essence of the present invention as there are several pilot devices available upon the open market which may be used. Preferably flames from the tube 40 impinge upon a thermionic generator 41 which supplies electrical current to an electromagnetic valve, not shown, that controls the admission of gas to the burner through pipe 15. Such valves are readily available and form no part of the present invention.

The number of burner elements 20, the dimensions thereof and the size of the manifold 10 and orifice 16 may be varied within the teachings of the invention. In one instance, in a burner designed to have a capacity of 100,000 B.t.u. per hour, nine burner elements 20 are provided. The manifold 10 is a ⅜-inch inside diameter pipe containing diametrically opposed ports 17. The orifice 16 is 3/16-inch in diameter. The nine ports 14 leading out of the manifold 10 and into the burner elements have a combined area slightly greater than the cross-sectional area of the manifold 10. The ports 24 leading out of each burner element are 32 in number and have a combined area greater than the area of the port 14 leading into the element.

With an arrangement of this kind it would seem that all the fuel would be fed to the burner elements nearest to the orifice 16 and that the remaning element would be receiving an inadequate quantity of fuel. It would be expected that uneven combustion would result. The contrary is true, however. With this arrangement, even burning occurs throughout the burner when the secondary air adjustment is correct. The screen wire wall prevents flash back, rumble and the like, and a quiet operation results. Since the secondary air drawn through the screen wall either directly engages flames 25 or flows in close proximity thereto, it is heated and therefore does not detract from the efficiency of the burner. The product of combustion engaging the heat exchange elements of the furnace or boiler are not cooled by unheated secondary air and the efficiency of the installation is not impaired. Radiation is increased due to improved heating of the refractory elements, radiation being as much a 46% more than that achieved in my above-mentioned patents and in other prior art devices of which I am aware.

The specific formulation of the refractory burner elements and liner strips may be varied within the teaching of the invention. Elements made from the material specified in the Woodruff Patent 3,192,247 by the method therein disclosed, have been found to be satisfactory. Refractory elements made of the material disclosed in this patent have been found to heat to incandescence more quickly than elements made of other materials of which I am aware.

For the foregoing it will be apparent that the burner of the instant invention is a distinct improvement over prior art burners, can be manufactured, maintained and operated economically, and is efficient in its operation. The improved and rapid heating to incandescence of the refractory elements permits maximum radiation to be obtained even during short periods of operation of the burner.

While I have chosen to illustrate my invention by showing and describing a preferred embodiment of it, I have done so by way of example only as there are many modifications and adaptations which can be made by one skilled in the art within the teaching of the invention.

Having thus complied with the statute and shown and described a preferred embodiment of my invention, what I consider new and desire to have protected by Letters Patent is pointed out in the appended claims.

What I claim is:
1. A gas burner, comprising:
 (a) An elongated rectangular metallic box having bottom, two side walls, one end wall and a top that covers only that portion of the box adjacent its open end;
 (b) a manifold located on the longitudinal medial line of the box and extending from the open end of the box to said end wall;
 (c) a fire wall extending from side wall to side wall and downwardly from the inner end of the top to the bottom of said manifold;
 (d) a plurality of spaced apart metallic trays fixed on said manifold and extending from side wall to side wall of the box, each tray having a planar bottom and flanges upstanding from each edge of that bottom;
 (e) a refractory burner element of U-section disposed in each tray with its open end down, there being a perforation in each tray registered with a perforation in the manifold through which gas may flow into the interior of the burner element, each element having a plurality of horizontally disposed perforations in each of its sides through which gas may flow out of the element;

(f) a refractory strip supported on said trays and against each of said side walls; and
(g) refractory strips fixed on said fire wall and on said end wall and abutting said first-mentioned strips to hold them against said side walls, all of said strips extending upwardly to the top edges of said walls.

2. A gas burner as specified in claim 1 in which the horizontally disposed perforations in the burner elements are each disposed immediately above the top edges of the flanges on the trays.

3. A gas burner as specified in claim 1 in which there is a screen wire wall beneath said manifold, extending from side wall to side wall and from said end wall to said fire wall, through which screen secondary air of combustion flows into the spaced between said trays.

4. A gas burner as specified in claim 3 in which a damper fixed on the lower end of said fire wall extends therefrom to the open end of said housing and from side wall to side wall thereof and in which an adjusting means engaging said damper adjacent its distal end positions the damper thereby to regulate the volume of said secondary air available to said burners.

5. A gas burner as specified in claim 4 in which, when ignited, gas flowing out of the perforations in the burners produces flames which impinge upon the adjacent burners producing a wall of flame into which secondary air flows to provide complete combustion of the fuel.

6. A gas burner as specified in claim 5 in which the impinging flames heat to incandescence the refractory material in the burners and in the strips.

UNITED STATES PATENTS
References Cited by the Examiner

| | | | |
|---|---|---|---|
| 1,632,513 | 6/1927 | Sharp. | |
| 1,950,470 | 3/1934 | Bellamy | 158—104 |
| 2,150,819 | 3/1939 | Brumbaugh | 158—104 |
| 2,192,752 | 3/1940 | Miller | 158—1 |
| 2,367,143 | 1/1945 | Schrader | 158—104 X |
| 2,625,992 | 1/1953 | Beck | 158—105 |
| 2,808,878 | 10/1957 | Ayers | 158—104 |

JAMES W. WESTHAVER, *Examiner.*